UNITED STATES PATENT OFFICE.

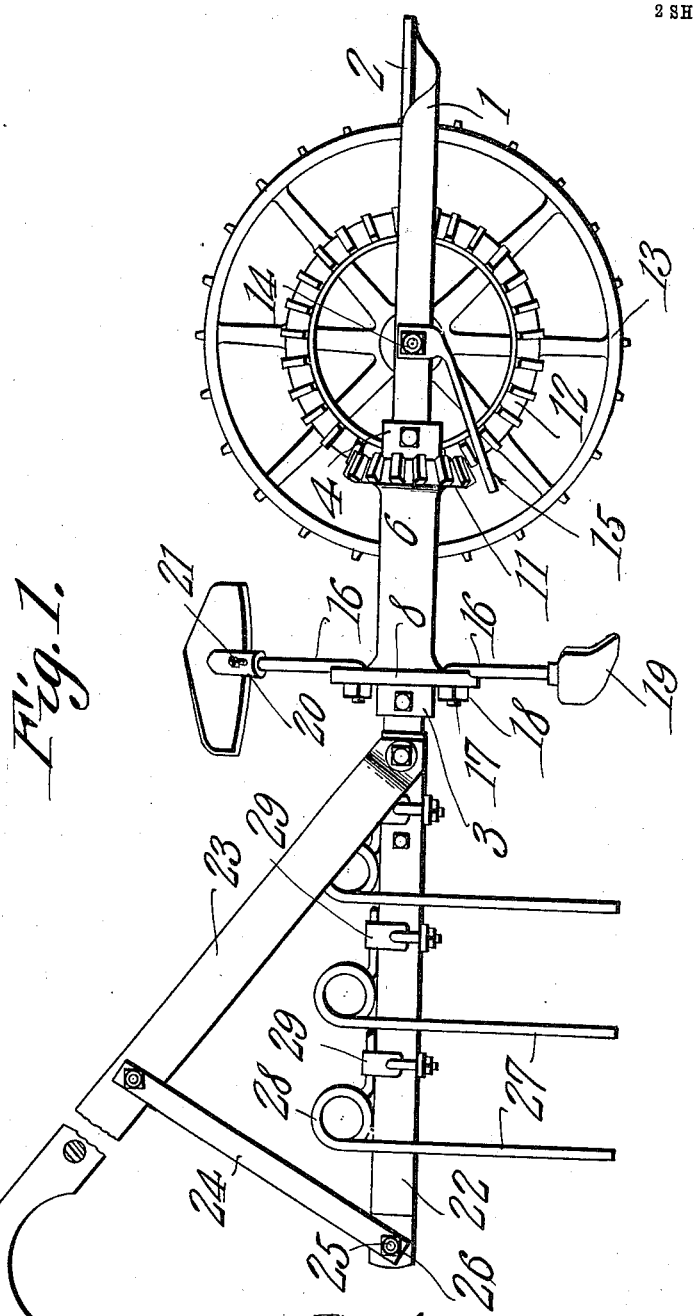

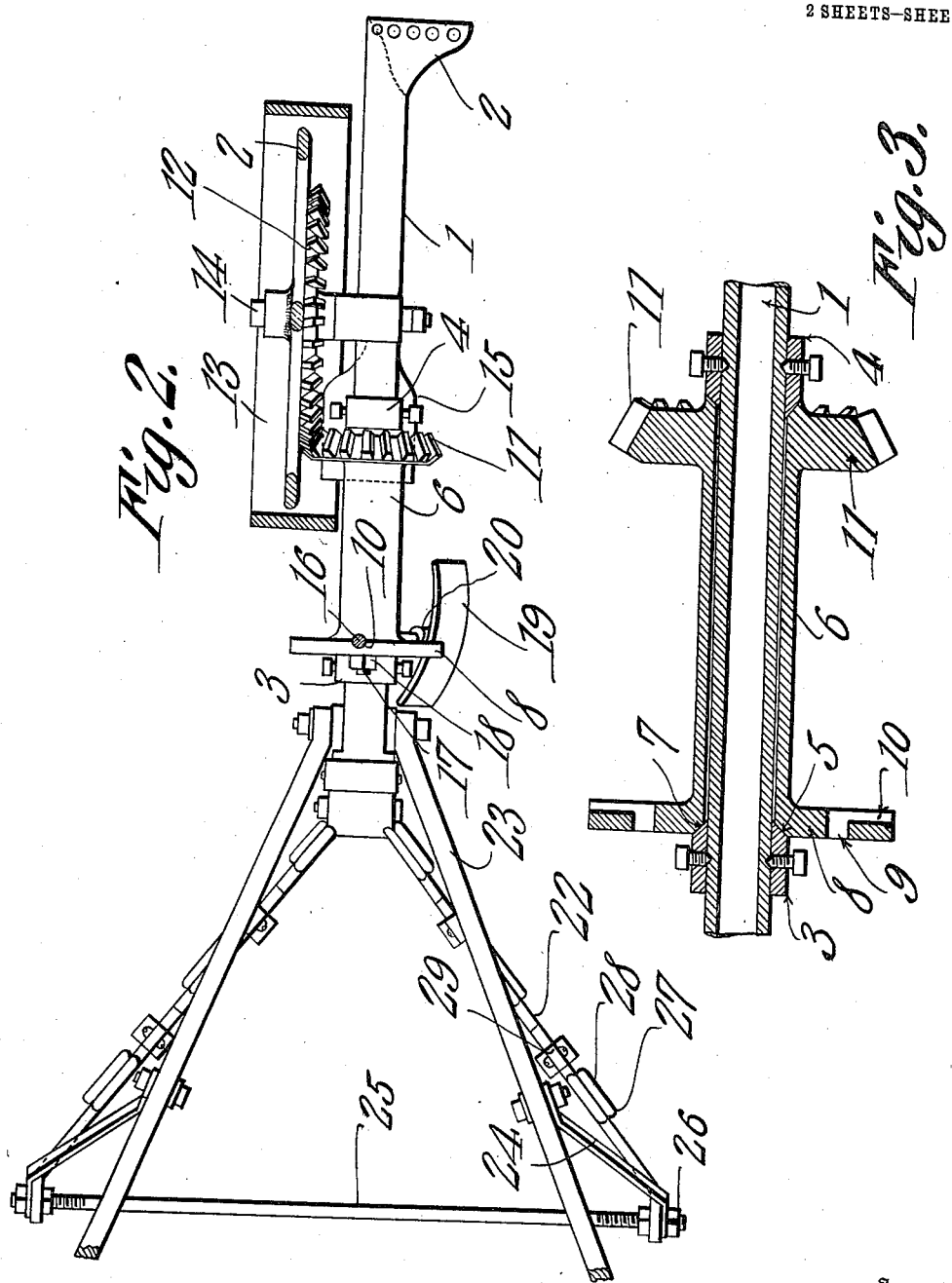

WILLIAM A. PLEDGER, JR., AND BENAJAH W. WOOD, OF GENEVA, ALABAMA.

COTTON-CHOPPER.

1,013,951. Specification of Letters Patent. Patented Jan. 9, 1912.

Application filed January 25, 1910. Serial No. 539,992.

*To all whom it may concern:*

Be it known that we, WILLIAM A. PLEDGER, Jr., and BENAJAH W. WOOD, citizens of the United States, residing at Geneva, in the county of Geneva and State of Alabama, have invented a new and useful Cotton-Chopper, of which the following is a specification.

This invention has relation to cotton choppers and it consists in the novel construction and arrangement of its parts as hereinafter shown and described.

The object of the invention is to provide a cotton chopper in the form of a simple structure having its parts so arranged as to effectually remove surplus plants from a row, while in operation, at the expenditure of a minimum amount of draft energy.

With the above objects in view the cotton chopper includes a beam formed from a section of pipe having a sleeve journaled for rotation thereon. A disk is formed at one end of the sleeve and to the said disk chopping blades are connected. A beveled pinion is located at the other end of the sleeve and is adapted to mesh with a gear rim which in turn is fixed to a supporting wheel journaled to the said beam. Angularly disposed bars are connected with the rear end portion of the beam as are also handles and braces connect the intermediate portions of the said handles with the rear ends of the said bars. A cross rod connects the rear ends of the bars together and means is provided for drawing the rear ends of the bars toward each other or spreading the same as desired. Spring teeth are adjustably mounted upon the bars and are adapted to act as cultivators at the time that the chopper is moving along a row of plants.

In the accompanying drawings, Figure 1 is a side elevation of the cotton chopper. Fig. 2 is a top plan view of the same. Fig. 3 is a longitudinal sectional view of a portion of the beam with the sleeve located thereon.

The cotton chopper includes a beam 1 which is preferably made of a pipe section having its forward end flattened and laterally disposed as at 2, said laterally disposed portion serving as a clevis for attaching a draft animal to the said beam. Collars 3 and 4 are fixed to the beam 1 and are beveled at their inner ends as at 5. A sleeve 6 is journaled upon the beam 1 between the collars 3 and 4 and is provided at its ends with concavities 7 which snugly receive the beveled end portions 5 of the said collars. A disk 8 is located at the rear end of the sleeve 6 and is provided with perforations 9 and grooves 10 extending from the periphery of the said disk to the said perforations 9. A beveled pinion 11 is located at the forward end of the sleeve 6 and meshes with a gear rim 12 attached to the side of the traction wheel 13. The said traction wheel 13 is journaled upon a spindle 14 which passes transversely through the forward portion of the beam 1. A guard plate or strip 15 is attached to the beam 1 and extends back under the lower portion of the pinion 11 and is adapted to prevent the plants or foliage from becoming enmeshed with the teeth of the pinion or gear rim 12. Arms 16 are provided with laterally disposed inner end portions 17 which pass through the perforations 9 provided in the disk 8 and the inner end portions of the said arms lie in the grooves 10. Nuts 18 are screw threaded upon the rear portions of the extremities 17 of the arms 16 and are adapted to hold the said arms in position upon the disk 8, the grooves 10 receiving the inner end portions of the said arms and preventing the same from assuming any other than radial relation to the axis about which the disk 8 rotates. Spirally formed blades 19 are provided upon their inner sides with sockets 20 which receive the outer end portions of the arms 16. Each socket 20 is provided with a set screw 21 which is adapted to impinge at its inner end against the outer portion of one of the arms 16 and serves as means for adjustably mounting the blades 19 upon the outer portions of the said arms. Angularly disposed bars 22 are connected at their forward ends with the rear end of the beam 1 and are located at the opposite sides of the said beam. Handles 23 are connected at their forward ends with the rear portion of the said beam and braces 24 are connected at their upper end to the said handles 23 at points between the ends thereof and at the lower ends the said braces are connected with the bars 22. A cross rod 25 passes through perforations provided at the rear ends of the bars 22 and clamp nuts 26 are screw threaded upon the end portions of the said cross rods 25 and serve as means for adjustably securing the rear portions of the said bars 22 upon the said cross rods. Cultivator teeth 27 are formed from spring rods and each tooth is provided with a coil 28 to add to its resiliency. The upper forward ends of the teeth 27 are secured to the side bars 22 by means of clips 29 which in turn are adjustably mounted upon the said side bars and thus means is provided for shifting the positions of the said teeth upon the said guide bars. The lower portions of the teeth 27 are vertically disposed and therefore as the chopper is drawn along the ground the lower ends of the teeth will scrape the surface of the soil without penetrating the same to any considerable extent.

In operation as the chopper is drawn along a row of standing plants the wheel 13 rotates the sleeve 6 through the intermeshing pinion 11 and rim 12. Thus the arms 16 are rotated about the axis of the said sleeve and the chopping blades 19 successively are brought in contact with the plants in the row and chop out the superfluous plants. At the same time the lower ends of the teeth 27 scrape the surface of the soil between the rows with a cultivating and harrowing effect. By adjusting the rear ends of the side bars 22 and by adjusting the position of the teeth 27 upon the said side bars, the said teeth may be caused to operate in close proximity to the plants left remaining in the row or in lines remote from the same as occasion may require. Also by adjusting the socket 20 upon the outer end portions of the arms 16 the blades 19 may be caused to operate at any desired depth below the surface of the soil.

Having described the invention, what is claimed as new is:

A cotton chopper, comprising a beam having a tubular portion intermediate of its ends, a drive wheel journaled to the beam forward of the tubular portion, a handle having its forward end attached to the beam in the rear of the tubular portion of the beam, two sleeves adjustably connected to the tubular portion of the beam and provided with cone bearing ends, a spool-shaped member surrounding and out of contact with the tubular portion and provided with cone bearings to engage and co-act with the cone bearings of the sleeves and by means of which the member is rotatably mounted upon the tubular portion of the beam, chopper blades carried thereby near the handle end of the beam, and coacting gears carried by the forward ends of the spool and the drive wheel.

In testimony that we claim the foregoing as our own, we have hereto affixed our signatures in the presence of two witnesses.

WILLIAM A. PLEDGER, Jr.
BENAJAH W. WOOD.

Witnesses:
J. R. HARPER,
J. L. GRIFFIN.

Copies of this patent may be obtained for five cents each, by addressing the "Commissioner of Patents, Washington, D. C."